United States Patent [19]
Grosjean et al.

[11] Patent Number: 5,816,436
[45] Date of Patent: *Oct. 6, 1998

[54] LIGHT STRUCTURE IN A PA 12-CARBON FOR THE STORAGE OF FLUID UNDER PRESSURE

[75] Inventors: François Grosjean, Versailles; Michel Huvey, Bougival, both of Falkland Is. (Malvinas)

[73] Assignee: Institut Francais du Petrole, Rueil-Malmaison, France

[*] Notice: This patent issued on a continued prosecution application filed under 37 CFR 1.53(d), and is subject to the twenty year patent term provisions of 35 U.S.C. 154(a)(2).

[21] Appl. No.: 709,138

[22] Filed: Sep. 6, 1996

Related U.S. Application Data

[63] Continuation of Ser. No. 445,957, May 22, 1995, abandoned.

[30] Foreign Application Priority Data

May 20, 1994 [FR] France ................................. 94/06.301

[51] Int. Cl.⁶ .................................................. B65D 90/02
[52] U.S. Cl. .......................................... 220/590; 220/589
[58] Field of Search ..................... 220/590, 589, 220/588, 586, 581, 414, 591, DIG. 11, DIG. 23

[56] References Cited

U.S. PATENT DOCUMENTS

| | | | |
|---|---|---|---|
| 3,851,786 | 12/1974 | Kaempen | 220/590 |
| 3,969,812 | 7/1976 | Beck | 220/590 |
| 4,588,622 | 5/1986 | Sukarie | 220/590 |
| 4,778,073 | 10/1988 | Ehs | 220/590 |
| 5,025,943 | 6/1991 | Forsman | 220/590 |
| 5,284,996 | 2/1994 | Vickers | 220/590 |
| 5,383,566 | 1/1995 | Johnson | 220/590 |
| 5,384,172 | 1/1995 | Takado et al. | 220/586 |

*Primary Examiner*—Stephen J. Castellano
*Attorney, Agent, or Firm*—Antonelli, Terry, Stout & Kraus, LLP

[57] ABSTRACT

A lightweight structure for containing fluid under pressure, the structure having no inner seal sheath and including a cylindrical zone formed with a single sheath consisting of a composite material which avoids microcracking phenomena provided by differential pressure existing betweeen an environment surrounding the structure and the pressure of the fluid within the structure. The sealed sheath remains sealed up to a pressure that is very close to the burst pressure of the structure. The composite material is made up of a polyamide 12 matrix and of carbon fibers embedded in the matrix to withstand longitudinal and transverse components of the differential pressure.

20 Claims, 1 Drawing Sheet

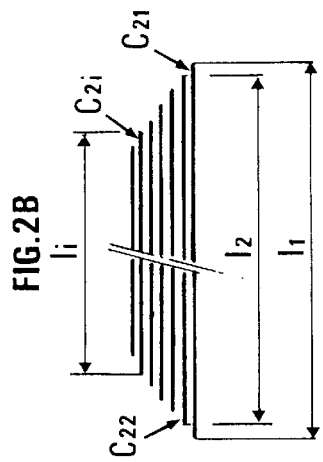
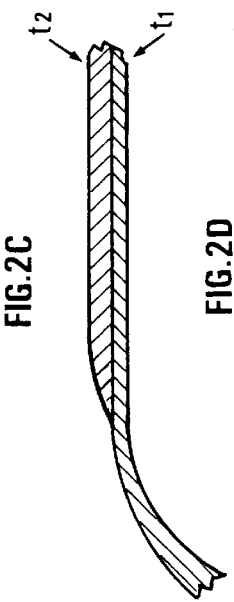
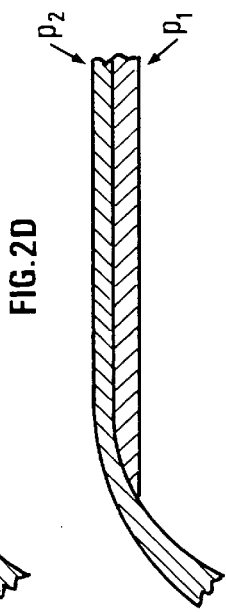
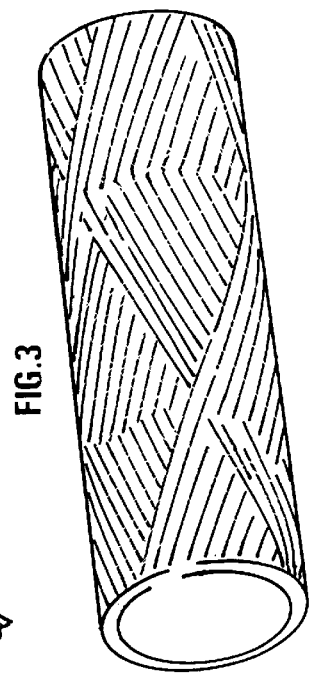
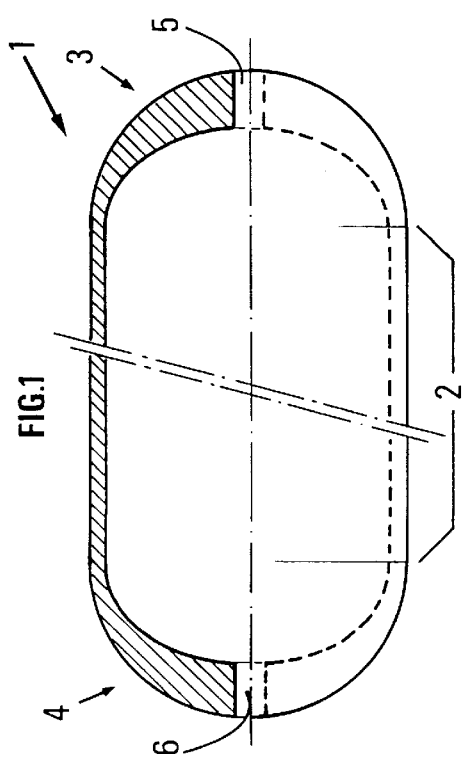
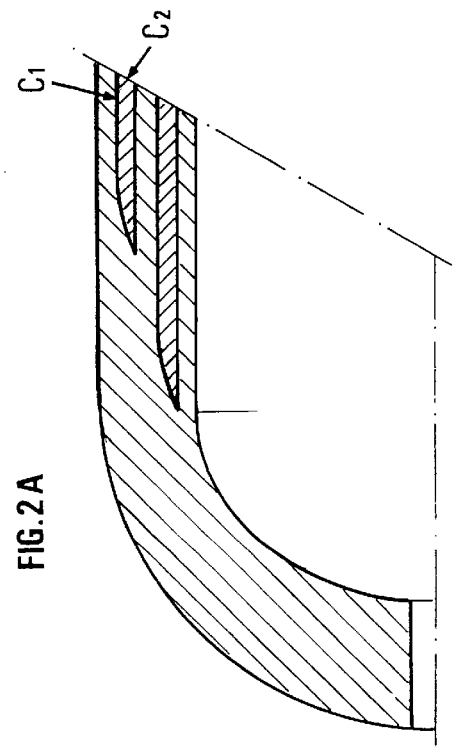

LIGHT STRUCTURE IN A PA 12-CARBON FOR THE STORAGE OF FLUID UNDER PRESSURE

This application is a continuation application of application Ser. No. 445,957, filed May 22, 1995 now abandoned.

FIELD OF THE INVENTION

The present invention relates to a hollow structure of low unitary weight capable of withstanding fluids having high pressures.

The structure according to the invention notably applies to the field of conveyance of fluids under pressure, where it is desirable to have tubes that are both light and pressure resistant.

The structure according to the invention can thus be a tube used for conveying heat carriers, for example, but not exclusively in the field of geothermics.

Another field of application relates to risers allowing transfer of the fluids or petroleum effluents from a source for example to a place of processing or used as as a relay.

The structure can notably be applied, for example, as a tank intended for storing fluids having high pressures.

BACKGROUND OF THE INVENTION

In order to be easily handled, such tanks must exhibit particular characteristics, notably be light and at the same time sufficiently pressure resistant.

In fact, the tanks or structures containing fluids under pressure are subjected to stresses resulting notably from the pressure difference between the fluid stored in the tank and the environment in which the tank is placed. The pressure difference has the effect of deforming the tank by leading to stresses that act against the deformation. These stresses notably result from the radial, longitudinal and circumferential components of the differential pressure.

The tanks described in the prior art describe structures comprising cylinders most often made of steel whose empty weight represents at least the equivalent of the weight of the conveyed fluid.

One of the improvements brought to steel bottles consisted in making light tanks utilizing notably the properties of composites combining the high tenacity of continuous fibers with the sealing properties of the organic resins used as binders for these fibers. Such tanks are for example described in the article by J. L. TISNE, of Aérospatiale, published in the journal COMPOSITES No.3 of May–June 1986 (pages 121 to 128) and present potentially a weight of about 20% to 25% of the weight of a steel tank of equal capacity. Unfortunately, these composites are subjected to microcracking phenomena, which leads to a phenomenon referred to as "running" or dripping of the material, which appears for pressures greatly lower than the expected burst pressure and which leads to a loss of tightness of the tank that limits their use for example to a pressure lower than the dripping pressure, this pressure being about 5 to 25 times less than the burst pressure.

The appearance of composites with continuous fibers and thermoplastic matrices such as glass-polypropylene has not allowed to obtain pressure vessels that do not "drip". In fact, in the absence of a seal undercoating, these vessels always have a dripping pressure that is much lower than the burst pressure measured in the presence of a seal undercoating.

The use of a seal undercoating may appear simple but, in fact, it raises many problems.

One of these problems, when the undercoating is metallic and perfectly sealed, relates to its fatigue strength. In fact, its elastic stretch is much lower than that of the composite forming the resistant coating, and the fatigue strength of the undercoating is notably lower than that of the mechanically resistant composite coating. In order to overcome such problems for example, it has been proposed in the patents and patent application FR-2,661,477 and FR-2,669,396 filed by the claimant to use a sheath or sheet comprising corrugations and allowing the circumferential coatings to be totally dissociated from the polar coatings. However, such devices always entail problems due to the weight of the seal sheet, which appears to be a parameter that is not inconsiderable.

Another way to combat tightness loss problems due to microcracking consists in placing inside tanks or vessels a supple sealed sheet such as a rubber or a thermoplastic sheet so as to prevent passage of the fluid towards the outer wall of the tank. This type of sheet nevertheless exhibits a permeability whose value depends on the material used and which can lead to fluid losses. In order to reduce these losses to the lowest possible value, the most simple solution consists in giving this sheet a great thickness, of a value of several millimeters, typically 5 mm, sometimes more.

For a given value of the volume of the tank, this amounts to placing the resistant coatings at a greater distance from the axis of the tank, and thereafter a greater resistant coating thickness is necessary to keep the stresses at an identical value, which leads to a higher casing weight and therefore to a tank of higher weight.

Besides, the stored fluid can dissolve partly in the seal wall and, in case of a fast decompression for any reason, the dissolved fluid can liberate in the core of said seal wall, by causing the formation of blisters that endanger the integrity of this wall.

A sheet providing a seal is therefore added in most cases, to the detriment of the desired lightness, its presence contributing to increasing the weight of the assembly.

Reconciliation of the lightness properties and of the pressure strength or resistance properties of a tank is therefore a difficult problem because the solutions allowing to lighten the tank and those contributing to increasing its pressure resistance often run counter to one another.

SUMMARY OF THE INVENTION

It has been discovered, and this is the object of the present invention, that it is possible to manufacture and to use light structures withstanding relatively high pressure values by combining judiciously the shape, the way to manufacture this structure and the material used for manufacturing it. Such an ordering of the elements cited above notably allows to prevent microcracking phenomena, to ensure the tightness of the structure and therefore to prevent possible leakages of the fluid it contains.

Such a structure is particularly well suited to the conveyance of compressed gases or of liquids under pressure such as butane gas or liquefied propane. The lightness that is given thereto facilitates handling and minimizes carriage expenses for example of tanks empty after use, which are of the same order as those caused by the conveyance of full tanks.

The present invention also applies to various fields where structures containing fluids under pressure, notably but not exclusively tanks intended for the storage of fluids under pressure, are often moved, or in places where the weight of storage structures can be a drawback, for example offshore platforms.

The light structure designed in this way can also be applied to the field of transportation, which is at the center of the current concern relative to sources of energy and of pollution, for which the weight of a tank can constitute an unnecessary load. Therefore, within the scope of the growing use of alternative energies, notably for economic and pollution reasons following, among other things, from increasingly severe standards, a structure according to the invention is particularly well suited to the storage of hydrocarbons such as liquefied petroleum gases (LPG), or natural gas, the latter coming in gaseous or in liquid form, and under high pressures. This structure can have the form of a single tank or of several tubes laid out to form a tank arranged on a commercial or an individual vehicle.

The object of the present invention relates to a light structure allowing to contain fluids under pressure. It is characterized in that it comprises a sheath consisting of a composite withstanding the differential pressure existing between the outside environment surrounding the structure and the pressure of the fluid, and in that the sheath remains sealed up to a pressure that is very close to the burst pressure of the tank.

The material of the sheath consists of a matrix made of polyamide and of carbon fibers embedded in the matrix, withstanding the longitudinal and the transverse components of the differential pressure.

According to an advantageous embodiment of the invention, the matrix of the sheath consists of polyamide 12.

The structure can be free from an inner seal sheath.

The sheath can comprise at least a first material coating deposited in the form of strips wound in a polar manner and at least a second material coating deposited in the form of strips wound in a circumferential manner, the first coating and the second coating being deposited alternately.

In another embodiment, the sheath can comprise a first material thickness consisting of strips of material deposited in a polar manner and a second material thickness consisting of strips deposited in a circumferential manner around the cylindrical zone resulting from the polar deposition.

The sheath can comprise a first material thickness consisting of strips of said material deposited in a circumferential manner and a second thickness consisting of strips of said material deposited in a polar manner around the first thickness.

The circumferentially deposited material strips comprise, for example, several coatings of the material, each coating having a length that decreases as its distance from the axis of the structure increases.

The light structure formed thereby can be a tube used for example for conveying fluids under pressure.

According to an embodiment of the invention, the structure formed thereby can be a riser used for conveying petroleum effluents.

In the field relative to the storage of fluids under pressure for example, the structure according to the invention is for example a tank or a vessel allowing such fluids to be stored.

In relation to the prior art, the structure according to the invention notably affords the advantages as follows:

The replacement of two distinct elements, i.e. an inner sheath and an outer casing usually used for their pressure strength and tightness properties in tanks of the prior art, by a single sheath or casing capable of withstanding the internal pressures of a fluid under pressure and of being tight provides a structure having a weight 40 to 50% lower than the weight of the structures of the prior art.

Furthermore, the material used to achieve this type of structure is in most cases resistant to the chemical aggressions of the stored fluids.

BRIEF DESCRIPTION OF THE DRAWINGS

Other features, details and advantages of the present invention will be clear from reading the description hereafter given by way of non limitative example, with reference to the accompanying drawings illustrating different embodiments, in which:

FIG. 1 describes a light structure or fluid storage tank such as that obtained through the process of the invention, FIGS. 2A, 2B, 2C and 2D show different layouts of material coatings forming a tank according to the invention, and FIG. 3 shows an example of a light structure tube according to the invention.

DESCRIPTION OF THE PREFERRED EMBODIMENTS

FIG. 1 shows a light structure for storing a fluid under pressure, for example, a tank or vessel 1 consisting for example of a sheath comprising a cylindrical zone 2, extended by two bottoms 3, 4 made of the same material as that of the cylindrical zone for example. Each of the bottoms comprises for example at least one opening 5, 6 located at the end of the tank. One of the bottoms can of course be free from an opening.

Openings 5, 6 can be provided with a valve of a conventional type.

The cylindrical zone 2 and bottoms 3, 4 are made from the same material, for example a composite exhibiting such characteristics that it can withstand the differential pressure existing between the outer environment in which the structure is placed and the pressure of the fluid it contains. The material consists for example of a polyamide matrix comprising fibers. The material used for the matrix is for example a polyamide and the fibers are carbon fibers.

The polyamide used is preferably a polyamide 12 and the material is commonly referred to as PA 12-carbon.

Advantageously, the percentage by volume of carbon fibers included in the polyamide 12 matrix ranges for example between 25 and 60%.

The material has for example the form of strips deposited according to a special layout so as to obtain a structure having the above-cited lightness and pressure strength properties. It is possible to deposit these strips in different ways, notably following the sequences described in connection with FIGS. 2A, 2B and 2D explained hereafter, in order to form the sheath or tank.

The bottoms 3, 4 preferably have a hemispherical or ellipsoidal shape so as to give the tank obtained a good resistance to pressure and therefore to the high pressure of the fluid stored inside the tank. The pressure forces resulting from the fluid stored have at least a longitudinal component and a transverse component which are taken up notably, almost totally, by the way of laying out the PA 12-carbon strips forming the tank.

The use of PA 12-carbon allows to manufacture a single sheath fulfilling the purpose of the inner sheath or liner and of the outer sheath usually encountered in the structures of the prior art. The structure may thus comprise no inner seal sheath.

FIG. 1 schematizes a tank made up of a layout of coatings such as that described in FIGS. 2A and 2B.

Tanks production techniques are known and described, for example, in the above-cited article by J. L. TISNE, of Aérospatiale; they are briefly mentioned in connection with FIGS. 2A, 2B, 2C and 2D.

To achieve a closed tank or vessel, the mandrel used as a support is for example a soluble mandrel that can be removed at the end of the structure manufacture process. This mandrel can be made of sand bound by a sugar solution and fitted with end plugs comprising threads suited for achieving the openings necessary to the communication of the tank with the outside.

The shape of the mandrel is such, for example, that it comprises a cylindrical zone and two bottoms, preferably of ellipsoidal shape, the size or dimension of this mandrel being selected according to that of the desired final tank, and the external shape of said mandrel corresponding to the internal shape of the tank to be formed.

For the manufacture of a hollow structure such as a tube used for conveying a fluid under pressure, the mandrel is for example of the conventional type commonly used in the manufacture of tubes.

In the example shown in FIG. 2A, for manufacturing the sheath, carbon-PA 12 strips are deposited in alternating layers comprising, for example, a first type of coatings $C_1$ resulting from a polar winding of PA 12-carbon strips and a second type of coatings $C_2$ resulting from a circumferential winding of carbon-PA 12 strips around the cylindrical zone of the supporting mandrel.

Winding of the carbon-PA 12 strips is for example so performed that the strips are overlapped over a given width and so that, when a strip is overlapped on a strip previously wound on the mandrel over a given width, a partial fusion of the surface of the strip is achieved by means of an appropriate device so as to weld the two strips together in order to give the tank a good tightness and a good pressure strength. Partial fusion is performed in a conventional way for the man skilled in the art, preferably at a point located for example several millimeters from the point of contact, so that the surface is still melting when the strip that is being laid comes into contact with the underlying strip already deposited during the previous winding.

The PA 12-carbon can have the shape of strips of thicknesses ranging for example between 0.1 and 0.5 millimeters.

A coating of type $C_1$ is first deposited by winding for example a PA 12-carbon strip in a polar manner.

It is then possible to deposit a coating of type $C_2$ around the coating $C_1$ formed previously and to repeat these two operations until the thickness desired for the tank is obtained, this thickness being selected according to the pressure values of the fluids to be stored and to the lightness required for the tank, which depends on the use for which the tank is intended.

FIG. 2A schematizes a lank layout comprising several coatings of type $C_1$ forming a coating of thickness $e_1$, then a first coating $C_{21}$ (FIG. 2B) of type $C_2$ over a length $l_1$ substantially equal to the length of the cylindrical zone defined by the cylindrical zone of the mandrel surrounded by coatings of type $C_1$ and of thickness $e_1$, then a second coating $C_{22}$ over a length $l_2$ less than the length $l_1$ of the first coating around the first coating $C_{21}$, the length difference being such that it allows to obtain a rounded shape, having for example a zone of hemispherical type following substantially the substantially hemispherical shape of the mandrel so as to form finally a tank whose shape is preferably hemispherical. Winding of the coatings of type $C_2$ is performed until a thickness $e_2$ is obtained.

Another set of coatings of type $C_1$ is thereafter deposited over a thickness $e'_1$ on the previously formed assembly, then another set of coatings of type $C_2$ over a thickness $e'_2$ and the previously described winding operations are repeated as many times as necessary to obtain a tank whose pressure resistance and lightness data are defined beforehand according to the fluid under pressure to be stored. Thicknesses $e_1$, $e'_1$, $e_2$ and $e'_2$ can be identical or different.

According to a variant of the invention, shown in FIG. 2C, the laying of the different coatings consisting of the PA 12-carbon strips can be performed by depositing for example around the mandrel several coatings of type $C_1$ over a total thickness $t_1$, then several coatings of type $C_2$ over a thickness $t_2$, the coatings of type $C_2$ being deposited around the assembly formed by the coatings of type $C_1$ and so that the length of each coating $C_{2i}$ decreases as its distance from the axis of the mandrel increases, i.e. the length $l_1$ of coating $C_{21}$ is greater than the length $l_2$ of coating $C_{22}$ and so on. It is thereafter possible to wind a coating of PA 12-carbon around the assembly as a final coat serving notably as a protective and a finishing coating.

The thicknesses $t_1$ and $t_2$ are determined according to the data relative to the tank to be obtained and notably the pressure resistance and the lightness which are for example defined beforehand according to the fluid under pressure to be stored.

Another procedure consists (FIG. 2D) in depositing around the mandrel coatings of type $C_2$ so as to form a thickness $p_1$, the coatings being deposited in an identical manner to that described above, i.e. the length of each coating decreases as its distance from the axis of the mandrel increases, and then in depositing in a polar manner the coatings of type $C_1$ over a thickness $p_2$.

The circumferential deposition of the coatings of type $C_2$ around the cylindrical zone of the mandrel or of the assembly of polar coatings deposited on the mandrel is preferably performed in such a way that the length of the different coatings decreases as the distance from the axis of the mandrel increases (see detail of FIG. 2B).

In the examples described in connection with FIGS. 2A to 2D, the bond between the different PA 12-carbon strips is achieved according to a conventional fusion technique known to the man skilled in the art, so as to give the structure or tank obtained a higher tightness than that which would be obtained with a tight winding.

It is possible, without departing from the scope of the invention, to use the PA 12-carbon in the form of thin plates, for example, so as to form the material coatings deposited circumferentially as described in FIGS. 2A to 2D.

Pressure strength and tightness tests have been carried out on tanks according to the invention and on vessels made of different materials and having different structures, comprising for example an inner sheath or liner and an outer casing. The fatigue strength of the metallic liner present in some vessels has been observed.

The results are presented in the table hereunder:

| Tank | (1) | (2) | (3) | (4) | (5) |
|---|---|---|---|---|---|
| Liner or inner sheath | 0.8-mm thick stainless steel | stainless steel | stainless steel cracked sheath | no liner | steel |
| Casing or outer sheath | glass-epoxy composite | carbon-epxoy composite | PA12 carbon | PA12 carbon single casing | steel |
| Weight daN | 24.5 | 18.5 | 16.7 | 10.2 | 64.8 |
| Number of cycles (*) | 495 cycles | 5500 | >40,000 | >100,000 | >100,000 |
| P = test pressure in bars | 250 | 250 | 250 | 250 | 200 |
| P % (burst pressure) | 46% | 46% | 46% | 46% | 36% |

(*)Number of compression/decompression cycles without appearance of tightness loss.

The weight given in the table above corresponds to the total weight resulting from the casing, the seal sheath and the end plugs.

For the carbon-PA 12 vessels of type (4) obtained according to the invention, the structure consists of a single casing serving as a liner and as a casing.

The results mentioned above show a much better performance for the tanks comprising a PA 12-carbon sheath according to one of the embodiments described in FIGS. 2A to 2D.

The weight of the structure achieved according to the invention is thus at least divided by a factor of 2, and 6 in relation to the weight of a steel tank.

Furthermore, the compression-decompression cycles show that the fatigue strength of the structure is at least 20 times as high as the pressure strength provided by tanks of the prior art (1), (2), except for the steel tank that has a markedly higher weight.

These results clearly show the combined lightness and pressure strength advantages provided by PA 12-carbon structures.

In fact, for a tank of type (1) consisting for example of an inner steel sheath comprising hemispherical bottoms and glass-epoxy composite coatings, deposited for example by winding alternating coatings, polar and circumferential, the tank has lost its tightness after 495 compression-decompression cycles;

the tank of type (2) reinforced by the carbon epoxy composite has been resistant for 5500 cycles;

the tests performed on the tank of type (3) consisting of an inner steel liner on which PA 12-carbon coatings were wound, prove that the tank is still sealed after 40,000 cycles, despite a crack in the inner steel sheath shown by means of appropriate techniques.

In fact, a control performed after cutting off the tank has shown that the inner sheath or metallic wall was open, the size of the opening proving that this opening had started long before the 40,000 cycles. This shows that the resistant structure itself had remained sealed under conditions for which all the other composite structures used had "run". It has been possible to carry out the tests up to more than 40,000 cycles, whereas the fatigue crack leakage of the metallic coating was expected between 1000 and 5000 cycles, at the elongation level used.

The last PA 12-carbon tank of type (4) of equal size, manufactured on a soluble mandrel, withstood 100,000 fatigue cycles under the same test conditions, without seal sheet and without tightness loss.

According to another embodiment, the light structure obtained with the present invention and described in FIG. 3 is a tube made by arranging PA 12-carbon coatings on a mandrel conventionally used for the manufacture of tubes and according to one of FIGS. 2A to 2D.

This tube is used for example for conveying fluids under pressure, notably in fields where such tubes must have pressure resistance and lightness characteristics.

It can thus advantageously form a riser or a riser satellite allowing the transfer of fluids or petroleum effluents that often exhibit a high pressure, for example when they come from high-pressure reservoirs.

Such a structure can also be used notably for its tightness and pressure resistance characteristics as an innner pipe or sheath interior to a structure. Its lightness allows this use because it leads to a low weight increase.

Such a type of application is often present in the petroleum field where risers comprise inner linings.

We claim:

1. A lightweight structure for containing fluid under pressure, said structure having no inner seal sheath and comprising a cylindrical zone formed of a single sheath consisting of a composite material comprising polyamide 12 carbon selected to avoid microcracking phenomena provided by differential pressure existing between an environment surrounding the structure and the pressure of the fluid within the structure, said single sheath remaining sealed up to a pressure that is very close to the burst pressure of the structure, said single sheath having a substantially uniform cross-section along the length of the cylindrical zone.

2. A lightweight structure as claimed in claim 1, wherein the composite material forming the single sheath consists of a polyamide 12 matrix and of carbon fibers embedded within the matrix, said fibers being arranged to withstand stresses resulting from longitudinal, circumferential and radial components of the differential pressure.

3. A lightweight structure as claimed in claim 2, wherein the single sheath consists of s multilayered assembly of at least a first coating made up of strips of said composite material deposited in a polar arrangement on a mandrel and at least a second material coating made up of strips of said composite material deposited in a circumferential manner on the first coating on the mandrel, the first coating and the second coating being deposited alternately to form the multilayered assembly.

4. A lightweight structure as claimed in claim 2, wherein the single sheath comprises a first material thickness consisting of strips of said composite material deposited in a polar manner on a mandrel and a second material thickness consisting of strips of said material deposited in a circumferential manner around the cylindrical zone resulting from the polar deposition of the first material.

5. A lightweight structure as claimed in claim 2, wherein the single sheath comprises a first material thickness consisting of strips of said composite material deposited in a circumferential manner and a second material thickness consisting of strips of said composite material deposited in a polar manner around the first thickness.

6. A lightweight structure as claimed in claim 3, wherein the circumferentially deposited material strips comprise several coatings of said composite material, the length of each coating decreasing as its distance from the axis of the structure increases.

7. A lightweight structure for containing fluid under pressure according to claim 1, wherein said polyamide 12 carbon selected to avoid microcracking phenomena is a polyamide 12 matrix comprising embedded carbon fibers in said matrix.

8. A lightweight structure for containing fluid under pressure according to claim 1 wherein said single sheath does not comprise corrugations.

9. A lightweight structure for containing fluid under pressure, said structure having no inner seal sheath and comprising a tube for conveying the fluid under pressure formed of a single sheath consisting of a composite material comprising polyamide 12 carbon selected to avoid microcracking phenomena provided by differential pressure existing between an environment surrounding the structure and the pressure of the fluid within the structure, said single sheath remaining sealed up to a pressure that is very close to the burst pressure of the structure, said single sheath having a substantially uniform cross-section along the length of the tube.

10. A lightweight structure as claimed in claim 9, wherein the composite material forming the single sheath consists of a polyamide 12 matrix and of carbon fibers embedded within the matrix, said fibers being arranged to withstand stresses resulting from longitudinal, circumferential and radial components of the differential pressure.

11. A lightweight structure for containing fluid under pressure according to claim 9, wherein said polyamide 12 carbon selected to avoid microcracking phenomena is a polyamide 12 matrix comprising embedded carbon fibers in said matrix.

12. A lightweight structure for containing fluid under pressure according to claim 11 wherein said single sheath does not comprise corrugations.

13. A lightweight structure for containing fluid under pressure, said structure having no inner seal sheath and being a riser for conveying petroleum effluents from a geological formation formed of a single sheath consisting of a composite material consisting essentially of polyamide 12 carbon selected to avoid microcracking phenomena provided by differential pressure existing between an environment surrounding the structure and the pressure of the fluid within the structure, said single sheath remaining sealed up to a pressure that is very close to the burst pressure of the structure, said single sheath having a substantially uniform cross-section along the riser.

14. A lightweight structure as claimed in claim 13, wherein the composite material forming the single sheath consists of a polyamide 12 matrix and of carbon fibers embedded within the matrix, said fibers being arranged to withstand stresses resulting from longitudinal, circumferential and radial components of the differential pressure.

15. A lightweight structure for containing fluid under pressure according to claim 13, wherein said polyamide 12 carbon selected to avoid microcracking phenomena is a polyamide 12 matrix comprising embedded carbon fibers in said matrix.

16. A lightweight structure for containing fluid under pressure according to claim 15 wherein said single sheath does not comprise corrugations.

17. A lightweight structure for containing fluid under pressure, said structure having no inner seal sheath and comprising a cylindrical zone formed of a single sheath consisting of a composite material comprising polyamide 12 carbon selected to avoid microcracking phenomena provided by differential pressure existing between an environment surrounding the structure and the pressure of the fluid within the structure, said single sheath remaining sealed up to a pressure that is very close to the burst pressure of the structure and two hemispherical end portions attached to the cylindrical zone to form a tank capable of containing a fluid under pressure, said end portions being formed of said composite material, said single sheath having a substantially uniform cross-section along the length of the cylindrical zone.

18. A lightweight structure as claimed in claim 17, wherein the composite material forming the single sheath consists of a polyamide 12 matrix and of carbon fibers embedded within the matrix, said fibers being arranged to withstand stresses resulting from longitudinal, circumferential and radial components of the differential pressure.

19. A lightweight structure for containing fluid under pressure according to claim 17, wherein said polyamide 12 carbon selected to avoid microcracking phenomena is a polyamide 12 matrix comprising embedded carbon fibers in said matrix.

20. A lightweight structure for containing fluid under pressure according to claim 19 wherein said single sheath does not comprise corrugations.

* * * * *